April 25, 1967  J. P. HORNER  3,315,858

SERVICE TRAY

Filed March 16, 1965

INVENTOR

Jack P. Horner

United States Patent Office 3,315,858
Patented Apr. 25, 1967

3,315,858
SERVICE TRAY
Joel P. Horner, 2256 Dougall Ave., Windsor,
Ontario, Canada
Filed Mar. 16, 1965, Ser. No. 440,164
2 Claims. (Cl. 224—48)

This invention relates to improvements in trays and more particularly to improvements in a food serving tray incorporating balance control means to facilitate carrying a number of glass or dishware particularly for use by waiters and the like.

It is conventional practice to utilize food serving trays in places such as restaurants, hotels, bars, or at parties, banquets, where there is a group of people being served. Trays of the conventional type are usually carried in one hand by skilled waiters or wheeled about on trolleys but otherwise having no means in themselves for assisting the user in carrying the contents.

These have the disadvantage of requiring considerable skill to be able to handle them quickly and efficiently. Furthermore, unless the user is sufficiently skilled in holding a tray in one hand, he must set it down each time before serving or removing the contents, making extra work for him. There is always the danger of spillage or breakage of the contents due to tipping the tray, since once it is in his hand he has very limited control over it. Furthermore, considerable energy is utilized in carrying and balancing the tray thereby excessively fatiguing the person carrying the tray.

It is an object of this invention to provide a food serving tray, in the following called "tray," the incorporated armrest means that distribute the load between hand and arm, the base being supplied with a surrounding downwardly depending ledge having a U-shaped cut out at one narrow end of the tray to permit the edge of the tray to rest on the arm of the user close to the elbow portion.

It is another object of this invention to provide a tray having a handle grip located under the tray substantially forward of the centre thereof to permit the hand to grip this thereby balancing the tray with contents between the handle grip and the elbow, giving the user full control of the contents of the tray without undue fatiguing his arm.

It is a further object of this invention to provide a tray having a box configuration with an open top, this open top being supplied with a removable plate or template, located on internal ledges around the upper edge of the tray, the plate having holes cut in it to position the contents, preventing them from sliding or tipping while the tray is being transported.

It is still another object of this invention to provide a tray having the base supplied with a surrounding downwardly depending ledge, sufficiently deep to conceal and prevent the handle grip from resting on the supporting surface, the edges of the ledge being supplied with nylon gliders or other like material, providing a supporting edge which will not mark the surface of a table nor make undue noise upon sliding along the table or being set thereon.

It is another object of this invention to provide a tray in which the base is supplied with a surrounding downwardly depending ledge, the area near the cut out end having extra cut outs to permit the user to insert his fingers thereinto and lift the tray up sufficiently to enable him to get his arm in and grip the handle for removal of the tray from a table or the like.

These and other objects and features of this invention will become apparent when taken in conjunction with the accompanying drawings in which.

Figure 1:
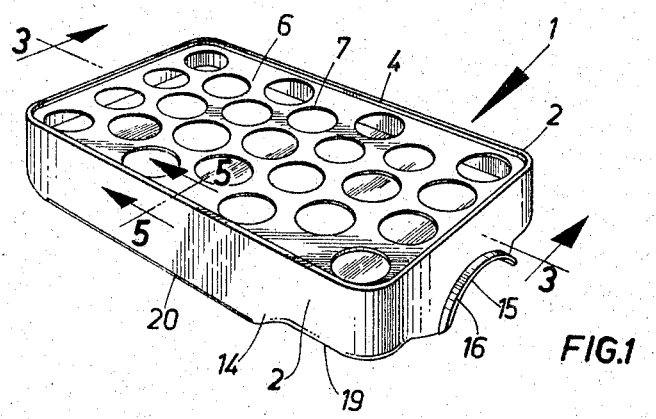
FIGURE 1 is a perspective view of a tray, embodying this invention, illustrating the removable template located in the open top of the tray, and also the arm rest at the one narrow end.
Figure 2:
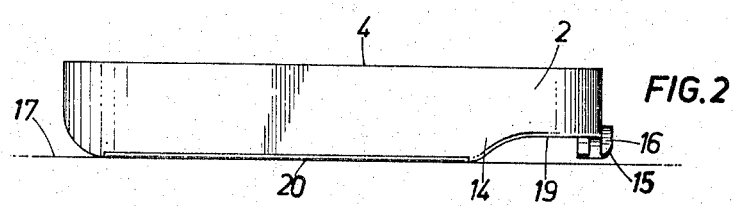
FIGURE 2 is a side elevation of the tray illustrated in FIGURE 1 showing particularly the inlaid glider along the bottom of the downwardly depending ledge and the raised position at the narrow end for the purpose of lifting the tray from its supporting surface.

Referring to FIGURES 1–5, the illustrated tray, generally indicated by arrow 1, comprises a substantially rectangular shaped box 2, having an open top with a top edge 4.

Located slightly below the top edge 4, on the inside surface of the box 2, a narrow ledge 5 extends continuously around the perimeter of the box. A removable template 6, having outside dimensions slightly smaller than the dimensions of the opening in the top of the tray is freely insertable to rest on narrow ledge 5, just below top edge 4. Template 6 is provided with cut outs 7, the size and location being chosen in respect to the article desired to be transported, allowing such article to fit freely into the opening without danger of falling over.

It will be noted that a number of templates 6, each with different sizes of cut outs 7, can be constructed to accommodate various sized articles for transport, interchangeably replacing the present template. The tray may also be used without any template when the occasion arises.

Figure 3:
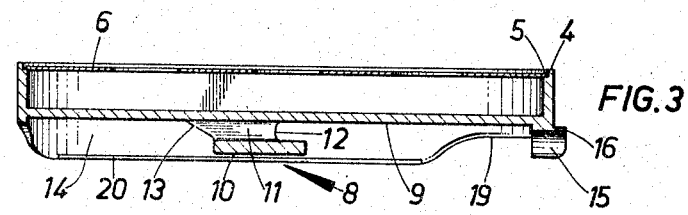
FIGURE 3 is a mid-sectional side elevation of the tray, illustrated in FIGURE 1 showing the location of the handle grip under the tray and the method of support for the removable template located in the open top.
Figure 4:
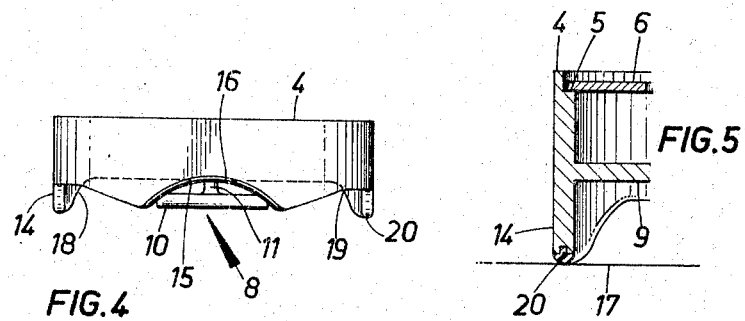
FIGURE 4 is an end elevation of the tray shown in FIGURE 1, illustrating the contour of the arm rest and the location of the handle grip under the tray.
Figure 5:
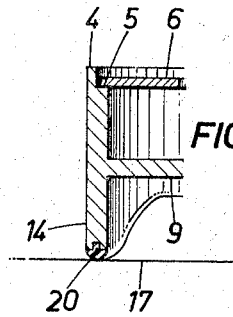
FIGURE 5 is a frictional, mid-sectional end elevation, showing particularly the manner of locating the removable template in the open top and also the detail of the inlaid glider on the bottom of the supporting ledge.

Referring to FIGURE 3 and FIGURE 4, a handle grip, generally indicated by arrow 8, is located under the base 9 of the tray substantially forward of the centre thereof, towards a forward end of tray 1, comprising a flat substantially circular portion 10 of a size and shape convenient for resting in the palm of the hand, and connected to the base 9 of the tray 1 by means of a narrow web 11 aligned along the longitudinal axis of the tray and particularly to base 9. The forward edge 12 of web 11 rises vertically from the centre of circular portion 10, and the rear edge 13 rises obliquely outwards from the perimeter of the circular portion 10.

The base 9 of the tray 1 is supplied with a surrounding downwardly depending ledge 14, this ledge having a cut out 15 at the narrow end of the tray remote from handle grip 11, to permit the edge of the tray to rest on the arm of the user close to the elbow portion.

Cut out 15 forms a substantially U-shaped contour, the edge of the cut out 15 being provided with a lip 16 thereon to increase the surface area in contact with the arm thus preventing the edge of the cut out 15 from pressing sharply and fatiguing the arm of the user.

It will be noted that the lip 16 of cut out 15 can be lined with a thin layer of soft material such as felt if necessary, providing further comfort to the arm of the user.

Downwardly depending ledge 14 is sufficiently deep to allow handle grip 11 to remain free from touching the surface 17 on which the tray is resting, the full weight of the tray being borne by ledge 14. Ledge 14 has an open portion 18 at the narrow end of the tray nearest to handle grip 11. The opposite end of ledge 14 nearest to cut out 15 has an extra cut out 19, leaving sufficient space above the supporting surface 17 to permit the user to insert his fingers thereunder and lift the tray sufficiently to enable him to get his arm in and grip the handle grip 11 for removal of the tray from its supporting surface 17.

Tray 1 is fully supported at its wide ends along the bottom edge of ledge 14. An inlaid glider portion 20, made of nylon or like material, is attached to the bottom edge of ledge 14, to provide a contacting medium between the tray and supporting surface 17. Its purpose is to prevent marking of the supporting surface 17, for instance, an expensive table top, and prevent undue noise upon sliding the tray along the surface or setting it thereon.

The method of utilizing a tray embodying this invention is as follows: Tray 1 resting on a surface 17, is grasped about the raised portion 19 of ledge 14 by inserting the fingers of one hand thereunder and lifting the tray up sufficiently to enable the other arm to reach in under the tray and grip the circular portion 10 of handle grip 11. Having placed the palm of the hand around the handle grip 11, the portion of the same arm near the elbow is placed into cut out portion 15 permitting the full weight of the tray to be transferred to the arm and the hand. Tray 1 is then raised into a carrying position, substantially horizontal at chest level, the hand and elbow suspension giving the user full control of the contents of the tray without undue fatiguing his arm.

To relocate the tray on a table, the arm holding the tray is lowered to the table top gently with an outward sliding motion, the far end being the first point to touch the table. Pressure is relieved from the elbow portion by raising the near end of the tray upwards with the free hand, pivoting the tray about the far end, until the first hand can be removed easily. Tray 1 is then lowered carefully to a horizontal position on the table.

To load the tray, the appropriate template 6 is freely inserted into the open top of the tray to rest on internal ledge 5, the appropriate articles then being placed into cut outs 7.

It will be noted that tray 1 can be made of plastic or wood or other suitable light material and can be shaped into any desired configuration compatible with manufacturing limitations. The user may easily carry two trays at once, employing this invention, one tray in each hand, or they may be mounted on a trolley if desired.

The general design of the individual parts of this invention as explained above may be varied according to requirements in regards to manufacture and production thereof, while still remaining within the spirit and principle of the invention, without prejudicing the novelty thereof.

I claim:

1. A serving tray comprising a tray base, said tray base having a forward end and a rearward end, said tray base being supplied with a surrounding downwardly depending ledge, said tray having an upper surface and under surface, said under surface being supplied with a downwardly depending post substantially forward of said under surface center, said post ending in a substantially circular plate located in a plane perpendicular to said post, said post and said plate comprising a downwardly depending handle means, said ledge located at said rearward end of said tray being supplied with a concave cutout, said cutout being supplied with a load distribution lip, said cutout and lip suitable to permit a user of said tray to nest his arm therein, substantially at his elbow, upon holding said handle and carrying said tray, said surrounding ledge being supplied with a shallow cutout on each side of said concave cutout, said shallow cutout being sufficiently deep to permit insertion of fingers of a user of said tray upon said tray being located on a flat surface and said user desiring to lift up said rearward end of said tray for insertion of his fingers of one hand thereunder and lifting the tray up sufficiently to enable the other arm to reach in under the tray and grip said handle, said downwardly depending ledge having a lower edge, portions of said lower edge being supplied with downwardly facing glider means of nonmarring and nonelastic material to permit said tray to slide smoothly over a surface without marring said surface.

2. A serving tray as claimed in claim 1 in which said surrounding downwardly depending ledge has an upwardly depending extension to provide a surrounding upwardly depending ledge, said upwardly depending ledge having a surrounding upper edge, said tray thereby having a boxed configuration, said upwardly depending ledge being internally, substantially toward said upper edge, supplied with a support ledge, and a perforated support plate located within said upwardly depending ledge on said support ledge, said perforations in said support plate having configurations suitable to permit insertion therein of beverage glasses, plates and food vessels.

References Cited by the Examiner

UNITED STATES PATENTS 953,007   3/1910   Haller.

FOREIGN PATENTS 248,226   3/1926   Great Britain.
462,472   3/1937   Great Britain.
684,227   12/1952   Great Britain.

GERALD M. FORLENZA, *Primary Examiner.*

J. E. OLDS, *Assistant Examiner.*